United States Patent [19]

Spethmann

[11] 4,147,296
[45] Apr. 3, 1979

[54] PROPORTIONAL DEMAND LIMIT CONTROLLER

[75] Inventor: Donald H. Spethmann, Arlington Heights, Ill.

[73] Assignee: Honeywell Inc., Minneapolis, Minn.

[21] Appl. No.: 859,505

[22] Filed: Dec. 9, 1977

[51] Int. Cl.² .......................................... G05D 23/12
[52] U.S. Cl. ...................................... 236/1 B; 236/51; 307/35; 307/39
[58] Field of Search .................. 165/11, 22; 236/1 B, 236/51; 307/34, 35, 38, 39, 62

[56] References Cited

U.S. PATENT DOCUMENTS

| Re. 17,851 | 10/1930 | Moore | 307/35 |
| 2,789,197 | 4/1957 | Boehm | 219/485 |
| 2,874,310 | 2/1959 | Young | 307/34 |
| 3,077,542 | 2/1963 | Daugherty | 307/34 |
| 3,291,998 | 12/1966 | Wildi | 307/35 |
| 3,296,452 | 1/1967 | Williams | 307/62 |
| 3,423,598 | 1/1969 | Goldberg | 307/35 |
| 3,708,684 | 1/1973 | Breitmeier | 307/35 |
| 3,767,894 | 10/1973 | Berger | 219/321 |
| 3,858,110 | 12/1974 | Breitmeier | 307/35 X |
| 3,901,308 | 8/1975 | Berger | 307/39 X |
| 4,020,358 | 4/1977 | Wyland | 307/39 |
| 4,027,171 | 5/1977 | Browder et al. | 307/39 |

Primary Examiner—Lawrence J. Staab
Attorney, Agent, or Firm—Trevor B. Joike

[57] ABSTRACT

In a system for limiting power consumption during peak power consuming periods, a proportional demand limit controller is disclosed having a condition sensor for sensing the condition of air being supplied to a space, a reset circuit responsive to the condition sensor for controlling a load connected thereto for in turn controlling the condition of the air being supplied to the space, and a proportional demand controller for sensing load consumption of the loads within a building and for resetting the reset circuit in a manner to maintain the power consumption of the building loads below a predetermined demand limit.

20 Claims, 6 Drawing Figures

PROPORTIONAL DEMAND LIMIT CONTROLLER

BACKGROUND OF THE INVENTION

This invention reltes to a peak demand limit controller and, more specifically, to a controller to reduce the power consumption of condition controlling loads in order to prevent power consumption of a building's loads from exceeding a predetermined demand limit.

In the recent past, demand for electrical energy has exceeded supply, particularly during seasonal peak load periods. For example, during the summer cooling season, suppliers of electricity have been unable to supply sufficient energy to satisfy their customers on those hot and humid days when both residential and industrial customers are drawing heavily upon the electrical supply to air condition their buildings. In some areas of the country, the desparity between the available supply of electricity and the demand for that electricity, during seasonal peak load periods, have caused "brown-outs" where the electricity supplied to customers is materially reduced because of high customer usage and "blackouts" where that usage is so high that it causes malfunctioning of the electrical generating equipment.

In order to avoid the high cost of constructing additional electrical generating plants to meet demand during seasonal peak load periods, suppliers charge a penalty whenever a user's power consumption exceeds a predetermined level. To avoid being charged these penalties, users have attempted to limit power consumption during seasonal peak load periods by cycling fans on and off or by limiting compressor capacity whenever the power consumption of the building approaches a predetermined demand limit, as established by the power company, and above which the penalty is charged.

However, cycling fans on and off produce space upsets, i.e., wide temperature fluctuations, increase equipment wear and preclude load reset of the chiller plant. Limiting chiller capacity has a number of drawbacks. All loads are similarly affected such that heavy loads are penalized most and light loads are not affected. Pumping power is increased because the chilled water temperature rises and local loop control, as a result, calls for increased flow. Also, the chilled water temperature is raised which impairs the dehumidification capability of the system.

SUMMARY OF THE INVENTION

Instead of cycling fans on and off or limiting compressor capacity, the controller of the present invention reduces load energization of each load connected to the controller by a proportional amount. In this way, the level of energization of each such air conditioning load as established by their associated sensors is reduced by the same percentage. Thus, heavy loads are not penalized to the benefit of the light loads. Furthermore, since the chilled water temperature is not allowed to rise, pumping power is not materially increased so that pumping power is saved. Also, the chilled water temperature is maintained at a proper level so that dehumidification is not impaired to the extent that it is in prior art systems.

Thus, an apparatus is disclosed for limiting the power consumption of a building's loads below a predetermined demand limit and includes multiple condition sensors for sensing the condition of air being supplied to space, load controllers or variable gain amplifiers for controlling the loads associated with the sensor in accordance with the condition of the air being supplied to the space and total load, a proportional demand controller for sensing total load consumption and, particularly, for sensing the approach of the load power consumption to a predetermined demand limit, and a reset circuit which controls the load controllers or variable gain amplifiers, and which resets the effect that the temperature sensors have on the loads to maintain power consumption of the building below a predetermined demand limit.

BRIEF DESCRIPTION OF THE DRAWINGS

These and other features and advantages will become more apparent from a detailed consideration of the invention and drawings in which.

DETAILED DESCRIPTION

Figure 1:
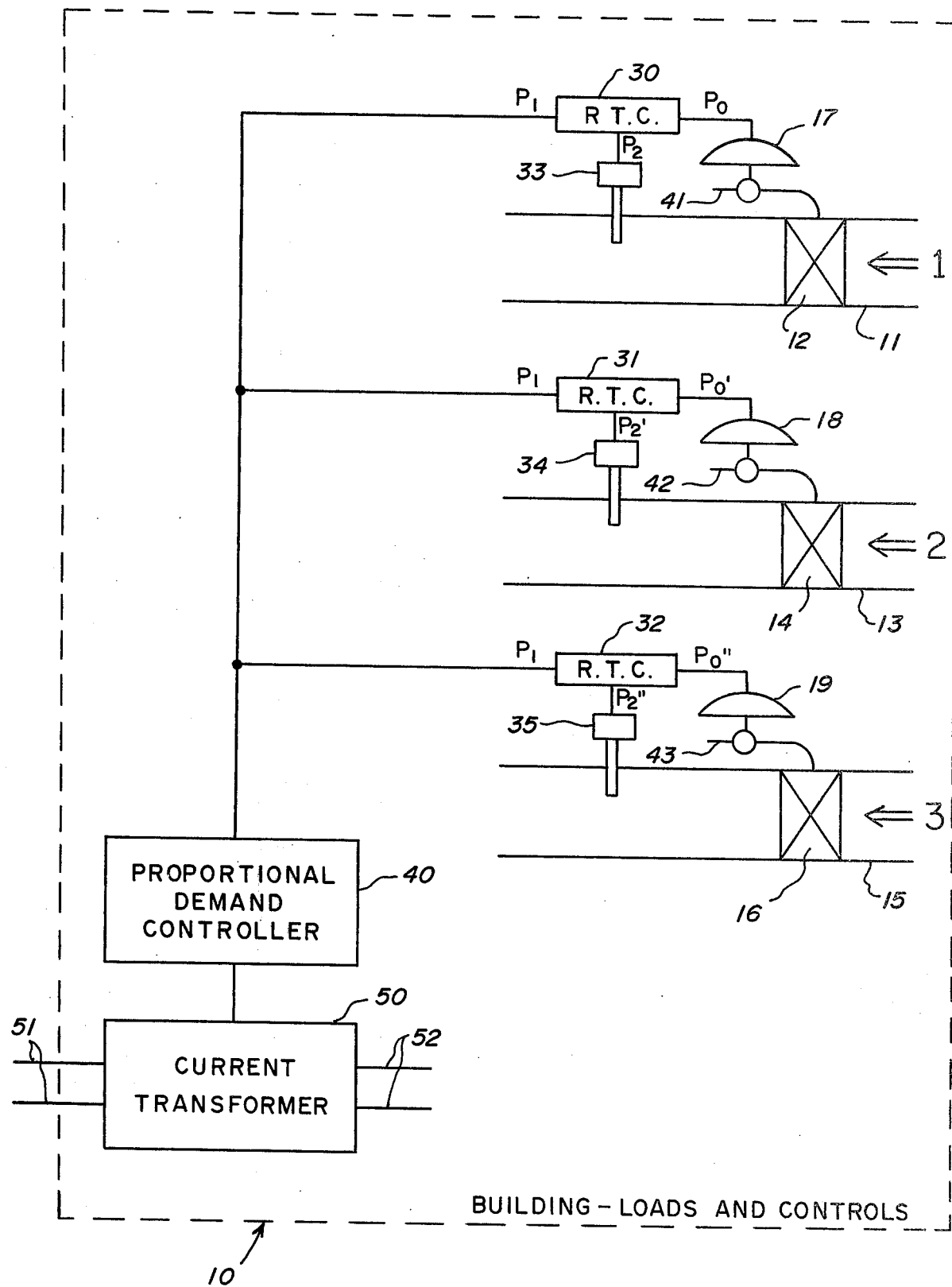
FIG. 1 shows a block diagram of the proportional demand limit controller for controlling three loads within a building.

In FIG. 1, building 10 has three air conditioning ducts therein. Duct 11 has cooling coil (or heating coil) 12, duct 13 has cooling coil 14, and duct 15 has cooling coil 16. Loads 12, 14 and 16 are controlled by respective load control means or valves 17, 18 and 19. Vale 17 receives an output from resettable temperature controller 30, valve 18 receives an output from resettable temperature controller 31 and valve 19 receives an output from resettable temperature controller 32. Resettable temperature controller 30 receives a first input from temperature sensor 33 and a second input from proportional demand controller 40. Resettable temperature controller 31 receives a first input from temperature sensor 34 and a second input from proportional demand controller 40. Resettable temperature controller 32 receives a first input from temperature sensor 35 and a second input from proportional demand controller 40.

The temperature sensor signals P2 from the temperature sensors modify resettable temperature controller signals P0 for the control of the respective valves. The signal P1 from the proportional demand controller 40 will reset each of the signals P0 from the resettable temperature controllers to affect the operation of the associated valves in a manner to reduce the amount of heat exchanged fluid allowed to pass from the main chiller to the coils 12, 14 and 16. Inlets 41, 42 and 43 to respective valves 17, 18 and 19 are thus connected to the output from a central chiller (not shown) and each coil 12, 14 and 16 will have a return line connected to the chiller.

The input to the proportional demand controller 40 is supplied by current transformer 50 which has inputs connected to power lines 51 entering the building and its outputs connected to output lines 52 which supply the power to the various loads within the building including the chiller or other type of condition controlling load. Output lines 52 supply all of the loads of the building while proportional demand controller 40 controls typically only loads which consume large amounts of power and which can be throttled downward without destroying their function. Such loads can include the building's chillers and/or other condition controlling equipment.

To show the manner in which power is saved with respect to chillers, it may be assumed that the space supplied by the air flowing in duct 11 is a heavy load so that temperature sensor 33 requires valve 17 to be 100% open, the space connected to duct 13 is a light load such that temperature sensor 34 requires valve 18 to be 50% open and the space connected to duct 15 is a light load resulting in temperature sensor 35 requiring valve 19 to be 40% open. Under these conditions, if a seasonal peak load period does not exist, such that the total current flowing through current transformer 50 is below level A shown in FIG. 4, the percent load signal supplied from proportional demand controller 40 will be 100% such that valve 17 will be maintained at its 100% opened condition, valve 18 will be maintained at a 50% opened condition and valve 19 will be only 40% open. However, if the total current flowing through current transformer 50 exceeds level A of FIG. 4, the percent load signal supplied from proportional demand controller 40 will be reduced such that valves 17, 18 and 19 will all be effected by the same proportional amount. In this manner, the chiller which supplies the chilled water to inlet lines 41, 42 and 43 will supply less water to these lines and will, therefore, not have to work as hard maintaining the chilled water at the desired temperature level so that a reduction of the power necessary for the chiller to maintain that chilled water temperature will be obtained. Thus, all loads are affected by the same percentage amount and the heavy load is not penalized to the benefit of the lighter loads. Moreover, the chiller pumps will not materially increase pumping power to supply a greater flow of water to the coils 12, 14 and 16.

Figure 2:
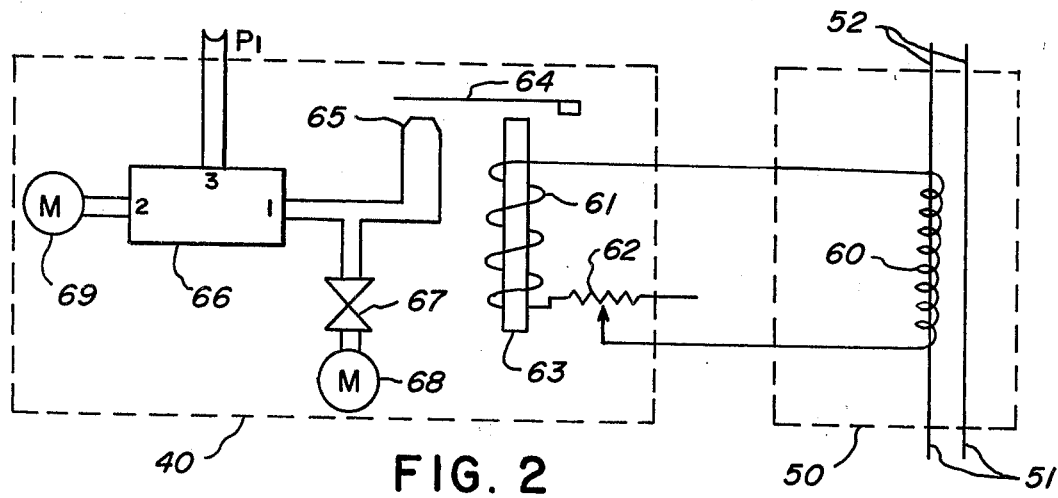
FIG. 2 shows the details of the proportional demand controller and the current transformer of FIG. 1.

The arrangement of FIG. 2 shows the details of the proportional demand controller 40 and the current transformer 50. Power lines 51 enter current transformer 50 and power lines 52 exit transformer 50. A current sensitive transformer 60 is wound around one of the power lines within current transformer 50 and is connected to a coil 61 through adjustable rheostat 62. Winding 61 is wound around armature 63 which positions flapper 64 with respect to nozzle 65 depending upon the current in winding 61. The nozzle 65, flapper 64, armature 63, and coil 61 arrangement may be part of Honeywell's RP7509A Electronic/Pneumatic Temperature Controller. Nozzle 65 is connected to port 1 of a reversing relay which may be a Honeywell RP972. The junction of nozzle 65 and port 1 of reversing relay 66 is connected through restriction 67 to a source of main pressure 68. Port 2 of reversing relay 66 is connected to a source of main pressure 69 and port 1 of reversing relay 66 is connected through restriction 67 to a source of main pressure 68. Port 2 of reversing relay 66 is connected to a source of main pressure 69 and port 3 is connected to an output line which supplies the P1 signal, i.e., the percent load signal, to resettable temperature controllers 30, 31 and 32 of FIG. 1.

Figure 3:
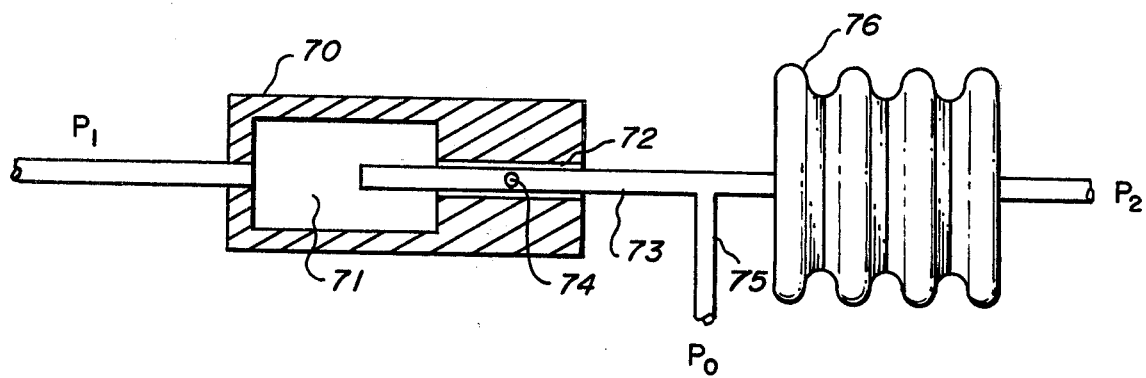
FIG. 3 shows the details of the reset temperature controller (R.T.C.) of FIG. 1.

The resettable temperature controller is shown in FIG. 3 and comprises a variable gain attenuator. Housing 70 of the variable gain attenuator has an interior chamber 71, connected to line P1, of a first circumference and a bore or passageway 72 having a circumference which is less than the circumference of the interior chamber 71. A hollow tube 73 extends through passageway 72 into the interior space 71. The space between housing 70 and tube within passageway 72 forms a restrictive passageway having a linear pressure gradient therethrough defined at one end by the pressure within chamber 71 and at the other end by atmosphere. An orifice 74 in tube 73 connects a pressure along this pressure gradient, depending upon its position along the passageway, through tube 73 to output port 75. Orifice 74 is positioned within passageway 72 by bellows 76 which receives pressure P2 from the corresponding temperature sensor connected to it.

Figure 4:
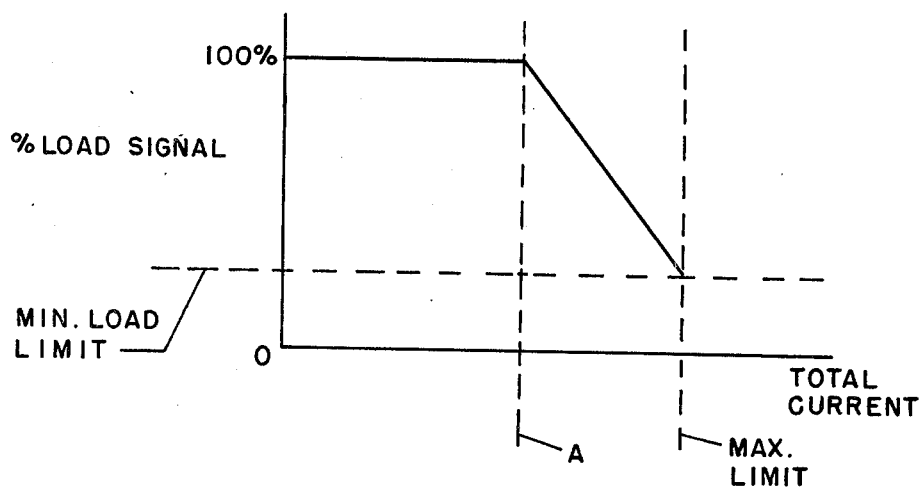
FIG. 4 shows the load signal supplied by the proportional demand controller of FIG. 1 as a function of the input current to the building.

As the current in the power lines increases, a point will be reached, as determined by the setting of rheostat 62 which selects the point A in FIG. 4 at which the percent load signal begins to decrease, where the movement of flapper 64 will respect to nozzle 65 beings to affect the pressure in nozzle 65. As the current in the power lines increases beyond level A, the flapper 64 is drawn to nozzle 65 which increases the pressure in nozzle 65. The reversing relay 66 reverses this pressure increase from nozzle 65 into a pressure decrease for pressure P1. On the other hand, a decreasing current in the power lines results in flapper 64 moving away from nozzle 65 which results in a decreasing pressure from nozzle 65 to reversing relay 66 and an increasing pressure P1 out of reversing relay 66.

A decreasing pressure P1 decreases the pressure in chamber 71 of the device shown in FIG. 3. Consequently, the pressure sensed by orifice 74 decreases and the pressure P0 decreases to allow the associated valve to reduce the flow of heat exchange medium to its associated coil. An increasing pressure P1, increases the pressure in chamber 71 which increases pressure P0.

An increase in the temperature within duct 11 sensed by sensor 33 results in an increased pressure P2 which moves the tube 73 in FIG. 3 into chamber 71 which allows orifice 74 to sense a higher pressure to increase P0. An increase of pressure P0 opens valve 17 by a greater amount to allow more heat exchange medium 41 to flow through cooling coil 12 to reduce the temperature in duct 11.

Figure 5:
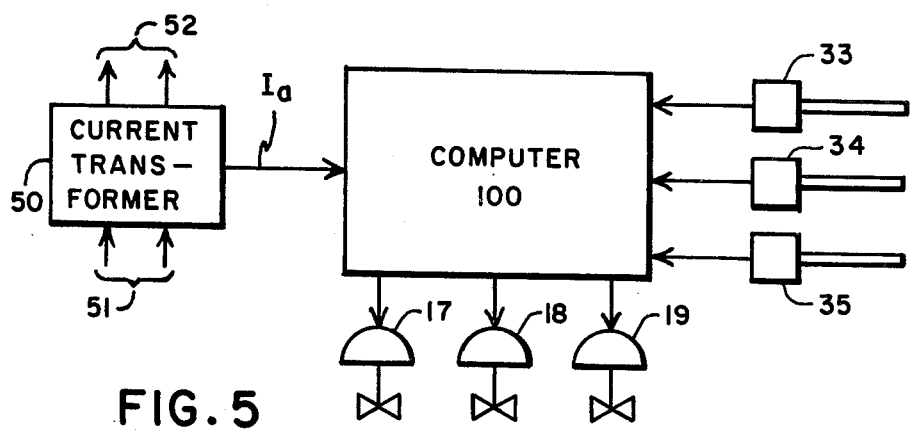
FIG. 5 shows a computerized system for accomplishing the functions of FIG. 1; and, FIG. 6 is a flow chart of the program to be used in the computer of FIG. 5.
Figure 6:
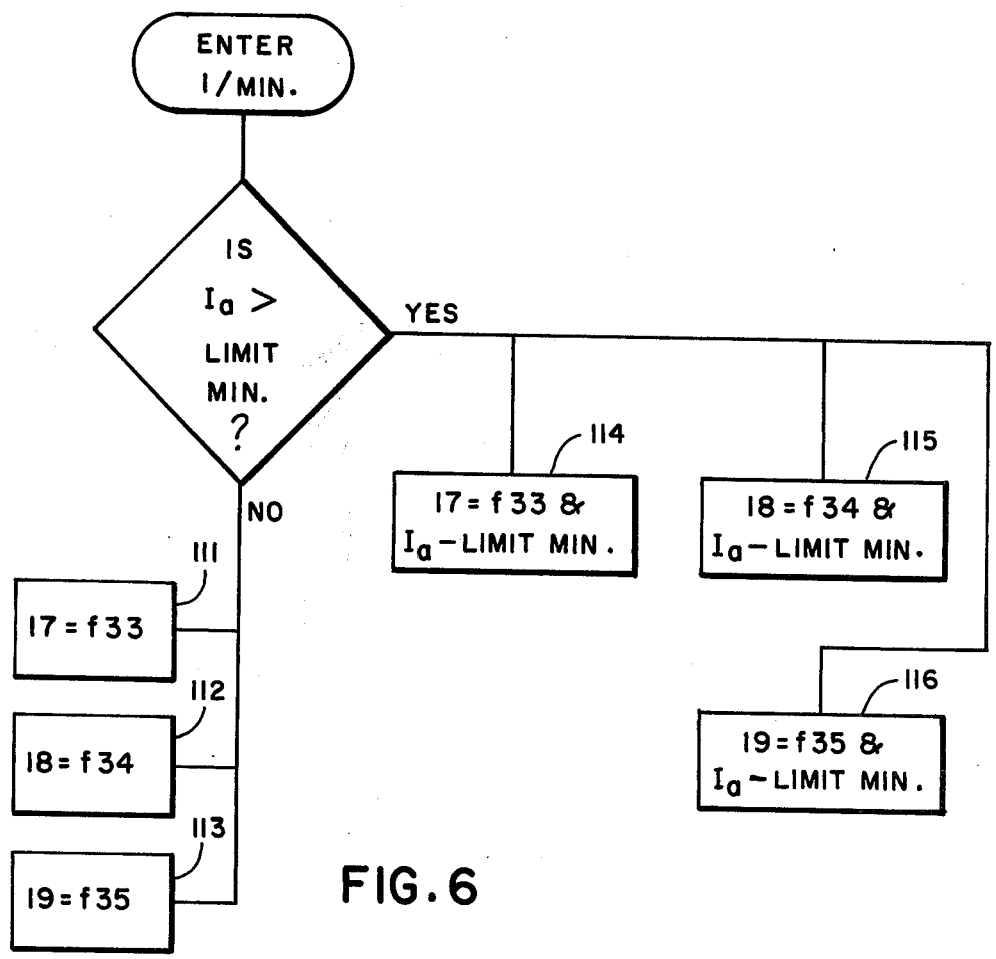

In FIG. 5, computer 100 (which may be the computer of a Honeywell Delta 1000 Building Automation System) is connected to temperature sensors 33, 34 and 35 as inputs and to valves 17, 18 and 19 as outputs. Additionally, computer 100 senses current $I_a$ from current transformer 50. As shown in FIG. 6, the computer samples current $I_a$ once every minute. If current $I_a$ is below a predetermined minimum value A, as shown in FIG. 4, then valves 17, 18 and 19 are controlled at positions determined by corresponding sensors 33, 34 and 35 as shown by boxes 111, 112 and 113 in FIG. 6. If current $I_a$ exceeds its minimum value A, then valves 17, 18 and 19 are controlled according to both the current $I_a$ and corresponding temperature sensors 33, 34 and 35 as shown by boxes 114, 115 and 116. Valves 17, 18 and 19 may be thus controlled in accordance with a prescribed relationship such as the curve shown in FIG. 4.

The embodiments of the invention in which an exclusive property or right is claimed are defined as follows:

1. An apparatus for limiting the power consumption of a building's loads below a predetermined demand limit, at least one of said loads controlling the condition of air within a building, said apparatus comprising at least:

condition sensing means for providing a first output dependent upon a condition of said air;

load control means adapted to control said at least one of said loads in accordance with the condition being sensed;

proportional demand controller means for sensing power consumption of said loads and for providing a second output dependent upon the approach of said power consumption to the predetermined demand limit; and, reset means connected to said condition sensing means for receiving said first output, connected to said proportional demand controller means for receiving said second output, and connected to said load control means, said reset means controlling said load control means in accordance with said first output, said second output resetting said load control means to maintain said power consumption below said predetermined demand limit.

2. The apparatus of claim 1 wherein said proportional demand controller means comprises a current transformer for sensing the current supply to the loads of the building.

3. The apparatus of claim 2 wherein said proportional demand controller means further comprises an output means connected to said current transformer for generating said second output.

4. The apparatus of claim 3 wherein said output means comprises a coil connected to said current transformer, a flapper operated by said coil, nozzle means having a pressure therein dependent upon the position of said flapper with respect to said nozzle means, and connecting means connected to said nozzle means for supplying said second output.

5. The apparatus of claim 4 wherein said reset means comprises a housing having a chamber of a first circumference connected to said connecting means and having a passageway, of a second circumference less than said first circumference, a tube extending into said passageway forming a restrictive passage having a pressure gradient therealong, said tube having an orifice for picking off a pressure along said pressure gradient, an output port connected to said tube to receive said pressure and connected to said load control means, an actuator connected to said tube to position said orifice along said passageway, said actuator being connected to said condition sensing means.

6. The apparatus in claim 5 wherein said load control means comprises a valve connected to said output port for controlling said load.

7. The apparatus in claim 6 wherein said condition sensing means comprises a temperature sensor for sensing the temperature of said air and connected to said actuator of said reset means.

8. The appartus of claim 1 wherein said reset means comprises a housing having a chamber of a first circumference connected to said proportional demand controller means and having a passageway, of a second circumference less than said first circumference, a tube extending into said passageway forming a restrictive passage having a pressure gradient therealong, said tube having an orifice for picking off a pressure along said pressure gradient, an output port connected to said tube to receive said pressure and connected to said load control means, an actuator connected to said tube to position said orifice along said passageway, said actuator being connected to said condition sensing means.

9. The apparatus in claim 8 wherein said load control means comprises a valve connected to said output port for controlling said load.

10. The apparatus in claim 9 wherein said condition sensing means comprises a temperature sensor for sensing the temperature of said space and connected to said actuator of said reset means.

11. An apparatus for limiting the power consumption of a building's loads below a predetermined demand limit, at least first and second loads of said building's loads controlling the condition of respective first and second bodies of air within a building, said apparatus comprising at least:

first and second condition sensing means for providing corresponding first and second outputs dependent upon a condition of said respective first and second bodies of air;

first and second load control means adapted to control said respective first and second loads in accordance with the condition of said respective first and second bodies of air;

proportional demand controller means for sensing power consumption of said building's loads and for providing a third output dependent upon the approach of said power consumption to the predetermined demand limit; and, first and second reset means connected to said respective first and second condition sensing means for receiving said respective first and second outputs, connected to said proportional demand controller means for receiving said third output, and connected to said respective first and second load control means, said first and second reset means controlling said respective first and second load control means in accordance with said respective first and second outputs, said third output resetting said first and second load control means to maintain said power consumption below said predetermined demand limit.

12. The apparatus of claim 11 wherein said proportional demand controller means comprises a current transformer for sensing the current supply to the building's loads.

13. The apparatus of claim 13 wherein said proportional demand controller means further comprises an output means connected to said current transformer for generating said third output.

14. The apparatus of claim 13 wherein said output means comprises a coil connected to said current transformer, a flapper operated by said coil, nozzle means having a pressure therein dependent upon the position of said flapper with respect to said nozzle means, and connecting means connected to said nozzle means for supplying said third output.

15. The apparatus of claim 14 wherein each of said first and second reset means comprises a housing having a chamber of a first circumference connected to said connecting means and having a passageway, of a second circumference less than said first circumference, a tube extending into said passageway forming a restrictive passage having a pressure gradient therealong, said tube having an orifice for picking off a pressure along said pressure gradient, an output port connected to said tube to receive said pressure and connected to said respective first and second load control means, an actuator connected to said tube to position said orifice along said passageway, said actuator being connected to said respective first and second condition sensing means.

16. The apparatus in claim 15 wherein said first and second load control means each comprises a valve connected to said respective output port of said respective reset means for controlling said respective first and second loads.

17. The apparatus in claim 16 wherein said first and second condition sensing means each comprises a temperature sensor for sensing the temperature of said respective first and second bodies of air and connected to said respective actuator of said respective first and second reset means.

18. The apparatus of claim 11 wherein said each of first and second reset means comprises a housing having a chamber of a first circumference connected to said connecting means and having a passageway, of a second circumference less than said first circumference, a tube extending into said passageway forming a restrictive passage having a pressure gradient therealong, said tube having an orifice for picking off a pressure along said pressure gradient, an output port connected to said tube to receive said pressure and connected to said respective first and second load control means, an actuator connected to said tube to position said orifice along said passageway, said actuator being connected to said respective first and second condition sensing means.

19. The apparatus in claim 18 wherein said first and second load control means each comprises a valve connected to said respective output port of said respective first and second reset means for controlling said respective first and second loads.

20. The apparatus in claim 19 wherein said first and second condition sensing means each comprises a temperature sensor for sensing the temperature of said respective first and second bodies of air and connected to said respective actuator of said respective first and second reset means.

* * * * *